United States Patent [19]
Yu-Hallada et al.

[11] Patent Number: 5,318,996
[45] Date of Patent: Jun. 7, 1994

[54] RIGID INSULATING POLYURETHANE FOAMS PREPARED FROM TERNARY BLOWING AGENT MIXTURES

[75] Inventors: Lorraine C. Yu-Hallada, Troy; Curtis J. Reichel, Southgate, both of Mich.

[73] Assignee: BASF Corporation, Parsippany, N.J.

[21] Appl. No.: 134,343

[22] Filed: Oct. 8, 1993

[51] Int. Cl.$^5$ ............................. C08J 9/12; C08J 9/14
[52] U.S. Cl. .................................. 521/131; 521/126; 521/127; 521/128; 521/174
[58] Field of Search ............... 521/131, 126, 127, 128, 521/174

[56] References Cited

U.S. PATENT DOCUMENTS

| | | | |
|---|---|---|---|
| 3,375,212 | 3/1968 | Bonner, Jr. ............................ | 521/131 |
| 5,254,400 | 10/1993 | Bonner, Jr. et al. ................. | 521/131 |
| 5,277,834 | 1/1994 | Bivens .................................. | 521/131 |

*Primary Examiner*—Morton Foelak
*Attorney, Agent, or Firm*—Dennis V. Carmen

[57] ABSTRACT

Polyurethane foams blown with a mixture of water, HCFC-22 or HCFC-141b, and a perfluorinated hydrocarbon having from 3 to 8 carbon atoms yields polyurethane and polyisocyanurate foams having exceptional physical properties, i.e., small and uniform cells, low initial K-factor, low aged K-factor, and high tensile strength. The low initial and aged K-factors are most unexpected when it is considered that significant amounts of water are used to blow the foam.

7 Claims, No Drawings

RIGID INSULATING POLYURETHANE FOAMS PREPARED FROM TERNARY BLOWING AGENT MIXTURES

FIELD OF THE INVENTION

The present invention pertains to rigid polyurethane foams. More particularly, the invention pertains to rigid closed celled polyurethane insulating foams prepared from a tertiary mixture of ternary mixture of blowing agents, at least one of which is a perfluorohydrocarbon having from 4 to 8 carbon atoms. The foams have a fine cell structure, low initial K-factor, and most importantly, maintain their K-factor upon aging.

DESCRIPTION OF THE RELATED ART

Virtually since their inception, rigid polyurethane foams have been blown with chlorofluorocarbons (CFCs), primary CFC-11. However, recent evidence linking ozone layer depletion to use of CFCs has led to international agreements and legislation to tax use of CFCs and eventually bar their use. Hence, the search for replacement for CFCs as blowing agents is under way.

Hydrocarbons such as pentane have been offered as a CFC blowing agent replacement; however, use of pentane as well as low boiling compounds, such as acetone, pose flammability problems as well as contributing to development of smog. Water has been used as a reactive blowing agent, reacting with the isocyanate component of the polyurethane system to produce carbon dioxide. However, the reaction also leads to the formation of urea linkages which may affect the physical properties of the foam; causes a high degree of heat buildup as the foam forming components react; and moreover, foams having a high initial K-factor which increases still further upon aging, thus defeating a major driving force for use of polyurethane foams: low thermal conductivity.

Hydrochlorofluorocarbons (HCFCs) have been proposed. However, the most common HCFC, monochlorodifluoromethane (HCFC-22), is a gas at room temperature whose solubility in conventional polyether polyols and isocyanates is not sufficiently great to allow for the quantities required for use as the sole blowing agent. Use of pressurized equipment allows for use of greater amounts of HCFCs, but adds expense and complication to the polyurethane production process.

Perfluorinated hydrocarbons have been proposed for use as blowing agents, for example by Otto Volkert, "PUR Foams Prepared with Emulsified Perfluorocarbons as Blowing Agents," *Proceedings of the SPI 34th Annual Technical/Marketing Conference*, Nice, France, Sep. 24–26, 1991. However, perfluorinated hydrocarbons are not soluble in polyether polyols; and due to their low blowing efficiency, large amounts must be stably dispersed. The current expense of these blowing agents is also high.

Attempts have also been made to prepare foams co-blown with binary blowing agent mixtures. It has been found that the use of such mixtures produces lower K-factor foams than use of water alone, for example, but aged K-factors still suffer. Moreover, some binary blowing agent mixtures contain CFCs whose use will soon become problematic, even in reduced quantity.

Use of "perfluorinated fluids" with HCFC-22 has been reported by others, memo from ICI Polyurethanes to 3M, Oct. 23, 1991. Low levels of perfluorinated fluids, c.a. less than 1.0 percent was shown to produce a 2 lb./ft$^3$ foam having an initial K-factor of 0.125 Btu-in/hr-ft$^2$° F. (0.018 W/mK), but the perfluorinated liquid was not identified, and appeared to be a condensable liquid based on the statement that there should be no leakage of the perfluorinated liquid from a foam insulated appliance. Moreover, no indication of aged K-factor was given.

SUMMARY OF THE INVENTION

It has now been surprisingly discovered that use of ternary blowing agent mixtures containing minimally water, monochlorodifluoromethane (HCFC-22) or dichlorofluoroethane (HCFC-141b), and a perfluorinated hydrocarbon having from 3 to 8 carbon atoms yields rigid closed cell polyurethane and polyisocyanurate foams having exceptional physical properties, i.e., small and uniform cells, low initial K-factor, low aged K-factor, and high tensile strength. The low initial and aged K-factors are most unexpected when it is considered that significant amounts of water are used to blow the foam. A process for making the foam is also described.

DESCRIPTION OF THE PREFERRED EMBODIMENT

Preparation of the rigid polyurethane foams has been described elsewhere, but basically involves reaction of a relatively high functionality polyether or polyester polyol and a urethane promoting catalyst with a polyisocyanate in the presence of a suitable blowing agent. The foams are normally prepared at an index of from 90–120, preferably an index of c.a. 100; but may also be highly overindexed and reacted in the presence of both a urethane and a trimerization (polyisocyanurate) catalyst. Here, indices of from greater than 120 to about 900, preferably from 200–350 are useful. Such foams contain both polyurethane and polyisocyanurate linkages.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,-and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'-and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The following have proven especially successful as organic polyisocyanates and are preferred for use in the preparation of polyurethane rigid foams; mixtures of toluene diisocyanates; polymeric MDI; mixtures of modified urethane groups containing organic polyisocyanates having an NCO content of from 33.6 to 15 weight percent most preferably, based on toluene diisocyanates, 4,4'-diphenylmethane diisocyanate, diphenylmethane diisocyanate isomeric mixtures or polymeric MDI and most preferably, polymeric MDI having a diphenylmethane diisocyanate isomeric content of from 30 to 80 weight percent, more preferably from 30 to 55 weight percent.

The polyol composition comprises at least a compound having at least two isocyanate reactive hydrogens, a urethane promoting catalyst, and at least part, if not all, of the blowing agent mixture. Preferably, polyhydroxyl compounds having a functionality of 2 to 8, more preferably 3 to 8, and a hydroxyl number of 150 to 850, more preferably 350 to 800 are examples of higher molecular weight compounds having at least two reactive hydrogen atoms.

For example, polythioether polyols, polyester amides, polyacetals containing hydroxyl groups, aliphatic polycarbonates containing hydroxyl groups, and preferably, polyester polyols and polyether polyols. In addition, mixtures of at least two of the aforesaid polyhydroxyl compounds can be used as long as these have an average hydroxyl number in the aforesaid range.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthaic acid, and terephthalic acid. The dicarboxylic acids can be used individually or in mixtures. Instead of the free dicarboxylic acids, the corresponding dicarboxylic acid derivatives may also be used such as dicarboxylic acid mono- or di-esters of alcohols with 1 to 4 carbons, or dicarboxylic acid anhydrides. Dicarboxylic acid mixtures of succinic acid, glutaric acid and adipic acid in quantity ratios of 20-35; 35-50:20-32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropane. Ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol and 1,6-hexanediol.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value, which is preferably less than 10, especially less than 2. In a preferred embodiment, the esterification mixture is subjected to polycondensation at the temperatures mentioned above up to an acid value of 80 to 30, preferably 40 to 30, under normal pressure and then under a pressure of less than 500 mbar, preferably 50 to 150 mbar. Examples of suitable esterification catalysts include iron, cadmium, cobalt, lead, zinc, antimony, magnesium, titanium and tin catalysts in the form of metals, metal oxides or metal salts. However, the polycondensation may also be performed in liquid phase in the presence of diluents and/or entraining agents such as benzene, toluene, xylene or chlorobenzene for azeotropic distillation of the water of condensation.

To produce the polyester polyols, the organic polycarboxylic acids and/or derivatives thereof and multivalent alcohols are preferably polycondensed in a mole ratio of 1:1-1.8, preferably 1:1.05-1.2.

The resulting polyester polyols preferably have a functionality of 2 to 3, and a hydroxyl number of 150 to 500, and especially 200 to 400. However, polyether polyols, which can be obtained by known methods, are especially preferred for use as the polyhydroxyl compounds. For example, polyether polyols can be produced by anionic polymerization with alkali hydroxides such as sodium hydroxide or potassium hydroxide or alkali alcoholates, such as sodium methylate, sodium ethylate or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical.

Suitable cyclic ethers and alkylene oxides include, for example, tetrahydrofuran, 1,3-propylene oxide, 1,2- and 2,3-butylene oxide, styrene oxide, and preferably ethylene oxide and 1,2-propylene oxide. The alkylene cyclic ethers and oxides may be used individually, in alternation, one after the other or as a mixture. Examples of suitable initiator molecules include water, organic dicarboxylic acids such as succinic acid, adipic acid, phthalic acid and terephthalic acid, aliphatic and aromatic, optionally N-mono-, N,N-, and N,N'-dialkyl substituted diamines with 1 to 4 carbons in the alkyl radical, such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5-, and 1,6-hexamethylenediamine, phenylenediamines, 2,3-, 2,4- and 2,6-toluenediamine and 4,4'-, 2,4'-, and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia.

Multivalent alcohols, especially divalent and/or trivalent alcohols are preferred such as ethanediol, 1,2-propanediol and 1,3-propanediol, diethylene glycol, dipropylene glycol, 1,4-butanediol, 1,6-hexanediol, glycerine, trimethylolpropane, pentaerythritol, sorbitol, and sucrose.

The polyether polyols have a functionality of preferably 3 to 8 and especially 3 to 6 and have a hydroxyl number of 300 to 850, preferably 350 to 800.

Also suitable as polyether polyols are melamine polyether polyol dispersions according to EP A 23 987 (U.S. Pat. No. 4,293,657); polymer polyether polyol dispersions prepared from polyepoxides and epoxide resin hardeners in the presence of polyether polyols according to U.S. Pat. No. 4,305,861; dispersions of aromatic polyesters in polyhydroxyl compounds according to U.S. Pat. No. 4,435,537; dispersion of organic and/or inorganic fillers in polyhydroxyl compounds according to U.S. Pat. No. 4,243,755; polyurea polyether polyol dispersions according to DE A 31 2 402, tris-(hydroxyalkyl)isocyanurate polyether polyol dispersions according to U.S. Pat. No. 4,514,526 and crystallite suspensions according to U.S. Pat. No. 4,560,708, whereby the details in the aforesaid patents are to be regarded as part of the patent disclosure, and are herein incorporated by reference.

Like the polyester polyols, the polyether polyols may be used either individually or in the form of mixtures. Furthermore, they can be mixed with the aforesaid dispersions, suspensions, or polyester polyols as well as the polyester amides containing hydroxyl groups, the polyacetals, and/or polycarbonates.

Examples of hydroxyl group-containing polyacetals that can be used include, for example, the compounds that can be produced from glycols such as diethylene glycol, triethylene glycol, 4,4'-dihydroxyethoxydiphenyldimethylmethane, hexanediol and formaldehyde. Suitable polyacetals can also be produced by polymerization of cyclic acetals.

Suitable hydroxyl group-containing polycarbonates include those of the known type such as those obtained by reaction of diols, e.g., 1,3-propanediol, 1,4-butanediol, and/or 1,6-hexanediol, diethylene glycol, triethylene glycol or tetraethylene glycol and diaryl carbonates, e.g., diphenyl carbonate, or phosgene.

The polyester amides include the mainly linear condensates obtained from multivalent saturated and/or unsaturated carboxylic acids and their anhydrides and amino alcohols, or mixtures of multivalent alcohols and amino alcohols and/or polyamines.

The polyurethane rigid foams can be prepared with or without using chain extending agents and/or crosslinking agents. To modify the mechanical properties, however, it has proven advantageous to add chain extenders, crosslinking agents or optionally mixtures thereof. Suitable chain extenders and/or crosslinking agents include preferably alkanolamines, more preferably diols and/or triols with molecular weights of less than 400, preferably 60 to 300. Typical examples are alkanolamines such as ethanolamine and/or isopropanolamine; dialkanolamines, such as diethanolamine, N-methyl-, N-ethyldiethanolamine, diisopropanolamine; trialkanolamines such as triethanolamine, triisopropanolamine; and the addition products from ethylene oxide or 1,2-propylene oxide, and alkylenediamines having 2 to 6 carbon atoms in the alkylene radical such as N,N'-tetra(2-hydroxyethyl)-ethylenediamine and N,N'-tetra(2-hydroxypropyl)ethylenediamine, aliphatic, cycloaliphatic and/or araliphatic diols having 2 to 14, more preferably 4 to 10 carbon atoms such as ethylene glycol, 1,3-propanediol, 1,10-decanediol, o-, m-, p-dihydroxycyclohexane, diethylene glycol, dipropylene glycol, and preferably 1,4-butanediol, 1,6-hexanediol, and bis(2-hydroxyethyl)hydroquinone; triols such as 1,2,4- and 1,3,5-trihydroxycyclohexane, glycerine and trimethylolpropane; and lower molecular weight hydroxyl group containing polyalkylene oxides, based on ethylene oxide and/or 1,2-propylene oxide and aromatic diamines such as toluenediamines and/or diaminodiphenylmethanes as well as the aforesaid alkanolamines, diols, and/or triols as initiator molecules.

If chain extending agents, crosslinking agents, or mixtures thereof are used in the preparation of polyurethane rigid foams, then advantageously these are used in a quantity of from up to 20 weight percent, more preferably 2 to 5 weight percent, based on the weight of the polyhydroxyl compound.

The blowing agent mixture contains minimally water in an amount of from 1 to about 4 weight percent; preferably from 1.25 to about 2.5 weight percent; chlorodifluoromethane (HCFC-22) or dichlorofluoroethane (HCFC-141b) blowing agent in an amount of from 3 to about 20 weight percent, preferably 10 to 15 weight percent; and a perfluorinated hydrocarbon containing from 3 to about 8 carbon atoms in an amount of from 0.1 to about 4.0 weight percent, preferably from about 0.2 to about 1.5 weight percent; all these weight percents based upon the weight of the polyol composition. Of course, the same effect may be obtained by adding all or a portion of the perfluorinated hydrocarbon or HCFC component to the isocyanate side. In particular, adding HCFC to both the isocyanate side and resin side is advantageous when using gaseous HCFCs, for example HCFC-22, as the vapor pressure of the gaseous HCFC above the liquid will be less when roughly half the HCFC is added to each side of the system. The water, of course, must remain in the polyol side.

The perfluorinated hydrocarbon contains from 3 to 8 carbon atoms and may be, for example, a perfluoroalkane (PFA), such as perfluoropropane, perfluorobutane, perfluoroisobutane, perfluoropentane, perfluoroisopentane, perfluoroneopentane, perfluorocyclopropane, perfluorocyclobutane, perfluorocyclopentane, perfluorocyclohexane, perfluorocyclooctane, perfluorohexane, perfluoro-2-methylpentane, perfluoroheptane, perfluorooctane, perfluoro-2-ethylhexane, and the like. Perfluorinated alkenes may also be utilized, but are not preferred. Examples are perfluoropropene, perfluoro-1-butene, perfluoro-2-butene, perfluorocyclohexene, perfluorocyclooctadiene, and the like. The perfluorinated hydrocarbon preferably has a boiling point at atmospheric pressure of from 0° C. to about 70° C., preferably from 20° C. to 60° C., and most preferably from 30° C. to about 50° C. Most preferred are perfluoropentane, perfluorohexane, or a mixture thereof. Also contemplated are mixtures of the above mentioned perfluorinated hydrocarbons. Perfluorinated hydrocarbon compositions which are not 100 percent perfluorinated, but which have at least 95 percent of the hydrogen atoms in the hydrocarbon replaced with fluorine atoms are also within the scope of the invention.

The perfluorinated hydrocarbons need only be used in minor amounts to lower to K-Factor of the rigid foam. Amounts as small as 0.25 weight percent have been successfully shown to reduce K-Factors. While much larger amounts around 3 to 4 weight percent, or even exceeding 4 weight percent may be employed, no further improvement in K-Factors is attained, and in the interest of efficiency, the amount of perfluorinated hydrocarbon should be kept as low as possible. The perfluorinated hydrocarbon is advantageously dispersed into the reaction mixture as described by Volkert by dispersing the perfluorinated hydrocarbon into the resin component at high speed or recirculatory pumping through the foam machine for several minutes.

Other methods of dispersion may also be used, such as ultrasonic cavitation, forcing the perfluorinated hydrocarbon or mixture of polyol and perfluorinated hydrocarbon through a homogenization plate having many microscopic apertures, and the like. Suitable surfactants or nucleating agents may be added to help maintain emulsion stability.

The HCFC component is one of monochlorodifluoromethane (HCFC-22) or dichlorofluoroethane (HCFC-141b). The amount of HCFC-22 utilized is from about 7 to about 20 percent based on the weight of the polyol composition, while the amount of HCFC-141b utilized ranges from about 3 weight percent to about 20 weight percent based on the weight of the polyol composition. About 15 percent are used, no advantage is seen when perfluorinated hydrocarbon is added, and for cost reasons, may be left out of the formulation.

Suitable catalysts include especially compounds that greatly accelerate the reaction of the hydroxyl group containing compounds of components and optionally with the polyisocyanates. Examples include organic metal compounds, preferably organic tin compounds such as tin (II) salts of organic carboxylic acids, e.g., tin (II) acetate, tin (II) octanoate, tin (II) ethylhexanoate and tin (II) laurate, and dialkyltin (IV) salts of organic carboxylic acids, e.g., dibutyltin diacetate, dibutyltin diacetate, dibutyltin dilaurate, dibutyltin maleate, and dioctyltin diacetate. The organic metal compounds are used alone or preferably in combination with strong basic amines. Examples include amines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N'N,'-tetramethylethylenediamine, N,N,N',N'-tetraymethylbutanediamine, or -hexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diaza-bicyclo[2.2.-2]octane and alkanolamine compounds such as triethanolamine, triisopropanolamine, N-methyl- and N-ethyldiethanolamine and dimethylethanolamine.

Suitable catalysts include tris-(dialkylamino-s-hexahydrotriazines, especially tris(N,N-dimethylaminopropyl)-s-hexahydrotriazine, tetralkylammonium hydroxides such as tetramethylammonium hydroxide, alkali hydroxides such as sodium hydroxide and alkali alcoholates such as sodium methylate and potassium isopropylate as well as alkali salts of long chain fatty acids with 10 to 20 carbons and optionally OH dependent groups.

Optionally other additives and/or auxiliaries may be incorporated into the reaction mixture to produce the polyurethane rigid foam. Examples include surface active substrates, foam stabilizers, cell regulators, fillers, dyes, pigments, flame retardants, hydrolysis preventing agents, fungistatic and bacteriostatic agents.

Examples of suitable surfactants are compounds which serve to support homogenization of the starting materials and may also regulate the cell structure of the plastics. Specific examples are salts of sulfonic acids, e.g., alkali metal salts or ammonium salts of fatty acids such as oleic or stearic acid, of dodecylbenzene- or dinaphthylmethanedisulfonic acid, and ricinoleic acid; foam stabilizers, such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 parts by weight, based on 100 parts by weight of the polyol component. Furthermore, the oligomeric acrylates with polyoxyalkylene and fluoroalkane side groups are also suitable for improving the emulsifying effect, the cell structure and/or for stabilizing the foam. These surface-active substances are generally used in amounts of 0.01 to 5 weight percent based on the weight of the polyol composition.

For the purposes of the invention, fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

Examples of suitable flameproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit ®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 5 to 50 weight percent, preferably from 5 to 25 weight percent, of said flameproofing agents may be used, based on the weight of the polyol composition.

Optional flame retardant compounds are tetrakis(2-chloroethyl) ethylene phosphonate, pentabromodiphenyl oxide, tris(1,3-dichloropropyl) phosphate, tris(beta-chloroethyl)phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)phosphate, tris(beta-chloropropyl)phosphate, and melamine.

The polyurethane rigid foams can be prepared batchwise or continuously according to the prepolymer process or more preferably according to the one-shot process with the help of conventional mixing equipment.

The starting components are mixed at a temperature of 15° to 90° C., more preferably 20° to 35° C., and introduced into an open, optionally heated mold where the reaction mixture is allowed to foam essentially pressure free to avoid a compressed peripheral zone. To form composite elements, typically the backside of a top layer is coated, for example, by applying a coating or spraying, with a foamable reaction mixture; then this is allowed to foam and cured into polyurethane rigid foam.

The polyurethane rigid foams are preferably used as insulating intermediate layers in composite elements and to foam hollow spaces in low temperature compartment housings, especially for refrigerators and deep chest freezers and said foams are used as exterior shells for hot water storage tanks. Products are also suitable to insulate heated materials or as motor coverings and as pipe shells.

The polyurethane and polyisocyanate foams of the subject invention have densities from about 1.2 to about 3.0 lb./ft$^3$, preferably from 1.5 to about 2.5 lb./ft$^3$, and most preferably 1.8 to about 2.2 lb/ft$^3$.

The invention is described further by way of non-limiting illustrative examples:

| | |
|---|---|
| Polyol A | is a sucrose/dipropylene glycol mixed initiated polyoxypropylene polyether polyol having a nominal OH number of 397. |
| Polyol B | is a glycerine initiated polyoxypropylene polyether polyol having a nominal OH number of 398. |
| Polyol C | is a polyethylene terephthalate polyester polyol having a nominal OH number of 350. |
| L-6900 | is a silicone surfactant. |
| DMCHA | is a urethane promoting catalyst; dimethyl cyclohexylamine. |
| PF 5050 | is perfluorinated pentane. |
| PF 5060 | is perfluorinated hexane. |
| ISO A | is a polymethylene polyphenylenepolyisocyanate having a functionality of about 2.5 and a free NCO content of 31.6 weight percent. |

EXAMPLE 1

Each of the foam ingredients listed in Tables 1-3 below were metered into the impingement mix head of a high pressure Edge Sweet foam machine. The perfluorinated alkanes were mixed by recirculatory pumping the PFA and the polyol ingredients through the foam machine for several minutes. The HCFC-22, a gas at room temperature, was bled into the recirculatory polyol stream as a flashing liquid. The foaming mixture was poured into 10" by 10" by 4" boxes from which the densities were taken. The PF 5050/5060 mixture was a 50:50 mixture. The same polyol ingredients used in Table 1 were used in Tables 2 and 3, except that the types of blowing agents and amounts thereof were varied. Each foam was run at an index of 110. The results of the poured foams are reported in Tables 1-3, and as can be seen by the results, addition of a perfluorinated hydrocabron, even in small amounts such as 0.25 weight percent, significant improved the K-Factors of a water-HCFC-22 or a water-HCFC-141 b blown system, having HCFC levels ranging from 4 to 20 weight percent, in spite of the presence of high amounts of water, the K-Factors remained substantially stable after aging 30 days at 140° F.

TABLE 1

| SAMPLES | 1 | 2 | 3 | 4 | 5 | 6 | 7 |
|---|---|---|---|---|---|---|---|
| POLYOL A | 50.0 | 50.0 | 50.0 | 50.0 | 50.0 | 50.0 | 50.0 |
| POLYOL B | 20.0 | 20.0 | 20.0 | 20.0 | 20.0 | 20.0 | 20.0 |
| POLYOL C | 30.0 | 30.0 | 30.0 | 30.0 | 30.0 | 30.0 | 30.0 |
| L-6900 | 3.00 | 3.00 | 3.00 | 3.00 | 3.00 | 3.00 | 3.00 |
| POLYCAT 5 | 0.70 | 0.70 | 0.70 | 0.70 | 0.70 | 0.70 | 0.70 |
| DMCHA | 0.55 | 0.55 | 0.55 | 0.55 | 0.55 | 0.55 | 0.55 |
| H20 | 2.00 | 2.00 | 2.00 | 2.00 | 2.00 | 2.00 | 2.00 |
| R22 | 4.50 | 9.20 | 14.50 | 20.30 | 9.50 | 14.90 | 20.80 |
| PF 5050 | | | | | | | |
| PF 5060 | | | | | 3.00 | 3.00 | 3.00 |
| PF 5050/PF 5060 | | | | | | | |
| ISO A | 133.40 | 133.40 | 133.40 | 133.40 | 133.40 | 133.40 | 133.40 |
| R22 IN RESIN | 4.06 | 7.97 | 12.01 | 16.04 | 8.00 | 12.00 | 15.99 |
| DENSITY (pcf) | 2.80 | 2.22 | 1.99 | 1.73 | 2.22 | 1.86 | 1.77 |
| K-FACTOR | | | | | | | |
| INITIAL | 0.139 | 0.131 | 0.128 | 0.126 | 0.127 | 0.127 | 0.126 |
| 10 DAYS AT 140 F | 0.17 | 0.164 | 0.152 | 0.157 | 0.137 | 0.138 | 0.144 |
| 30 DAYS AT 140 F | 0.192 | 0.184 | 0.175 | 0.179 | 0.166 | 0.165 | 0.17 |

TABLE 1-continued

| SAMPLES | 8 | 9 | 10 | 11 | 12 | 13 | 14 |
|---|---|---|---|---|---|---|---|
| POLYOL A | 50.0 | 50.0 | 50.0 | 50.0 | 50.0 | 50.0 | 50.0 |
| POLYOL B | 20.0 | 20.0 | 20.0 | 20.0 | 20.0 | 20.0 | 20.0 |
| POLYOL C | 30.0 | 30.0 | 30.0 | 30.0 | 30.0 | 30.0 | 30.0 |
| L-6900 | 3.00 | 3.00 | 3.00 | 3.00 | 3.00 | 3.00 | 3.00 |
| POLYCAT 5 | 0.70 | 0.70 | 0.70 | 0.70 | 0.70 | 0.70 | 0.70 |
| DMCHA | 0.55 | 0.55 | 0.55 | 0.55 | 0.55 | 0.55 | 0.55 |
| H20 | 2.00 | 2.00 | 2.00 | 2.00 | 2.00 | 2.00 | 2.00 |
| R22 | 9.50 | 14.90 | 20.80 | 9.50 | 14.90 | 14.90 | 20.80 |
| PF 5050 | | | | 3.00 | 3.00 | 3.00 | 3.00 |
| PF 5060 | | | | | | | |
| PF 5050/PF 5060 | 3.00 | 3.00 | 3.00 | | | | |
| ISO A | 133.40 | 133.40 | 133.40 | 133.40 | 133.40 | 133.40 | 133.40 |
| R22 IN RESIN | 8.00 | 12.00 | 15.99 | 8.00 | 12.00 | 12.00 | 15.99 |
| DENSITY (pcf) | 2.01 | 1.89 | 1.78 | 2.05 | 1.93 | 1.77 | 1.83 |
| K-FACTOR | | | | | | | |
| INITIAL | 0.127 | 0.126 | 0.128 | 0.127 | 0.127 | 0.122 | 0.13 |
| 10 DAYS AT 140 F | 0.141 | 0.141 | 0.144 | 0.15 | 0.149 | 0.162 | 0.163 |
| 30 DAYS AT 140 F | 0.17 | 0.172 | 0.173 | 0.171 | 0.17 | 0.178 | 0.184 |

TABLE 2

| SAMPLES | PF 5060 | PF 5050 | PF 5060/5050 | R141B IN RESIN | DENSITY (pcf) | K-FACTORS: INITIAL | 10 DAYS 10 DAYS AT 140 F | 30 DAYS AT 140 F |
|---|---|---|---|---|---|---|---|---|
| 1 | | | | 0.00 | 4.09 | 0.153 | 0.187 | 0.205 |
| 2 | | | | 4.06 | 3.44 | 0.143 | 0.152 | 0.173 |
| 3 | | | | 7.97 | 3.03 | 0.131 | 0.138 | 0.157 |
| 4 | | | | 12.01 | 2.70 | 0.13 | 0.141 | 0.156 |
| 5 | | | | 19.96 | 2.07 | 0.119 | 0.137 | 0.146 |
| 6 | 3.0 | | | 9.97 | 2.31 | 0.126 | 0.144 | 0.153 |
| 7 | 3.0 | | | 15.01 | 2.01 | 0.117 | 0.135 | 0.147 |
| 8 | 3.0 | | | 20.05 | 1.96 | 0.116 | 0.138 | 0.146 |
| 9 | | | 3.0 | 9.97 | 2.15 | 0.122 | 0.141 | 0.152 |
| 10 | | | 3.0 | 15.01 | 2.01 | 0.12 | 0.137 | 0.147 |
| 11 | | | 3.0 | 20.05 | 1.66 | 0.117 | 0.135 | 0.14 |
| 12 | | | 3.0 | 20.05 | 2.04 | 0.127 | 0.14 | 0.151 |
| 13 | | 3.0 | | 9.97 | 2.20 | 0.122 | 0.139 | 0.151 |
| 14 | | 3.0 | | 15.01 | 1.97 | 0.121 | 0.137 | 0.146 |
| 15 | | 3.0 | | 15.01 | 1.88 | 0.115 | 0.139 | 0.147 |
| 16 | | 3.0 | | 20.05 | 1.62 | 0.112 | 0.137 | 0.144 |
| 17 | | 3.0 | | 20.05 | 2.01 | 0.125 | 0.142 | 0.152 |

TABLE 3

| SAMPLES | 1 | 2 | 3 | 4 | 5 | 6 | 7 | 8 | 9 | 10 | 11 | 12 |
|---|---|---|---|---|---|---|---|---|---|---|---|---|
| R141b | 26.60 | 26.60 | 26.60 | 26.60 | 26.60 | 26.60 | 26.60 | 26.60 | 26.60 | 26.60 | 26.60 | 26.60 |
| PF 5050 | 0.70 | 1.30 | 2.00 | 2.70 | | | | | 0.35 | 0.65 | 1.00 | 1.35 |
| PF 5060 | | | | | 0.70 | 1.30 | 2.00 | 2.70 | 0.35 | 0.65 | 1.00 | 1.35 |
| % PFC IN TOTAL | 0.26 | 0.49 | 0.75 | 1.00 | 0.26 | 0.49 | 0.75 | 1.00 | 0.26 | 0.49 | 0.75 | 1.00 |
| % R141b IN TOTAL | 9.96 | 9.94 | 9.92 | 9.89 | 9.96 | 9.94 | 9.92 | 9.89 | 9.96 | 9.94 | 9.92 | 9.89 |
| MECHANICAL TESTING (PACKED BOXES) HAND-MIX | | | | | | | | | | | | |
| DENSITY (pcf) | 1.56 | 1.60 | 1.57 | 1.57 | 1.54 | 1.56 | 1.50 | 1.55 | 1.51 | 1.55 | 1.55 | 1.55 |
| K-FACTOR | | | | | | | | | | | | |
| INITIAL | 0.127 | 0.128 | 0.125 | 0.129 | 0.125 | 0.126 | 0.125 | 0.126 | 0.126 | 0.127 | 0.122 | 0.124 |
| 10 DAYS AT 140 F | 0.143 | 0.140 | 0.139 | 0.141 | 0.137 | 0.137 | 0.138 | 0.135 | 0.141 | 0.138 | 0.138 | 0.135 |
| 30 DAYS AT 140 F | 0.158 | 0.160 | 0.155 | 0.157 | 0.152 | 0.153 | 0.152 | 0.152 | 0.155 | 0.157 | 0.153 | 0.155 |

We claim:

1. A process of making a rigid closed cell polyurethane foam comprising reacting an organic polyisocyanate with a polyol composition in the presence of a blowing agent mixture comprising:
   (a) water;
   (b) chlorodifluoromethane or dichlorofluoroethane; and,
   (c) perfluorinated hydrocarbons having from 3 to 8 carbon atoms or mixtures thereof.

2. The process of claim 1, wherein the blowing agent (b) is chlorodifluoromethane.

3. The process of claim 1, wherein the amount of water ranges from 1.23 weight percent to 2.5 weight percent, the amount chlorodifluoromethane is from 10 weight percent 15 weight percent, and the amount of perfluorinated hydrocarbon is from 0.2 weight percent to 1.5 weight percent.

4. The process of claim 2, wherein the foam has an initial thermal conductivity of from about 0.120 BTU in/hr ft$^2$F to about 0.130 BTU in/hr ft$^2$F, at molded densities from about 1.7 pcf to about 2.2 pcf.

5. The process of claim 2, wherein at least part of component (b) is mixed with the organic polyisocyanate prior to reaction with the polyol composition.

6. The process of claim 1, wherein the polyol composition comprises a polyester polyol.

7. The process of claim 6, wherein the foam contains isocyanurate linkages and is reacted in the presence of a trimerization catalyst.

* * * * *